United States Patent [19]

Morishita

[11] 4,365,241

[45] Dec. 21, 1982

[54] DEVICE FOR INDICATING THE CHARGING STATE OF A BATTERY

[75] Inventor: Mitsuharu Morishita, Himeji, Japan

[73] Assignee: Mitsubishi Denki Kabushiki Kaisha, Tokyo, Japan

[21] Appl. No.: 288,869

[22] Filed: Jul. 31, 1981

Related U.S. Application Data

[63] Continuation of Ser. No. 74,025, Sep. 10, 1979, abandoned.

[30] Foreign Application Priority Data

Sep. 12, 1978 [JP] Japan ................................. 53-125741

[51] Int. Cl.³ .......................... G08B 21/00; H02J 7/14
[52] U.S. Cl. .................................... 340/636; 340/650; 322/99; 322/68; 320/49; 320/43
[58] Field of Search ................ 340/636, 635, 648–650, 340/661, 662, 52 F; 320/48, 49, 64, 43, 68; 322/99, 28

[56] References Cited

U.S. PATENT DOCUMENTS

| 3,568,041 | 3/1971 | Arakane | 322/99 |
| 3,612,978 | 10/1971 | Mori | 322/99 |
| 3,781,633 | 12/1973 | Iwaki et al. | 322/99 |
| 3,942,097 | 3/1976 | Itoh et al. | 322/99 |
| 4,143,313 | 3/1979 | Arendt | 322/99 |

Primary Examiner—John W. Caldwell, Sr.
Assistant Examiner—Donnie Lee Crosland
Attorney, Agent, or Firm—Sughrue, Mion, Zinn, Macpeak and Seas

[57] ABSTRACT

A device of indicating the charging state of a battery including a series combination of a diode and an indicating lamp connected between an output terminal of a rectifying means of an alternator and a battery. A first switching means activates the indicating lamp when the battery voltage is less than a first lower predetermined value. A second switching means turns the first switching means off when the battery voltage rises above the first predetermined value. A third switching means reactivates the indicating lamp when the battery voltage exceeds a second higher predetermined value.

14 Claims, 2 Drawing Figures

DEVICE FOR INDICATING THE CHARGING STATE OF A BATTERY

This is a continuation, of application Ser. No. 74,025, filed Sept. 10, 1979 now abandoned.

BACKGROUND OF THE INVENTION

This invention relates to a device for indicating the charging state of a battery such as used in a motor vehicle and more particularly to an indicating device capable of indicating an overcharged state of a battery.

From a conventional device of the type to which the invention pertains, it is generally known that when the ignition system of a vehicle is turned on but the combustion engine itself is not started, an indicating lamp is illuminated to indicate a non-charging state of the vehicle's battery and that when the engine is started thereby driving the alternator, the indicating lamp is turned off in accordance with a rise in the output voltage of the alternator so as to indicate a fully charged state of the battery.

If the output voltage of the alternator drops to zero for any reason during operation of the engine, the indicating lamp is illuminated to warn the driver of the non-charging state of the battery. However, if the output voltage of the alternator were to become extremely high due to failure, for example, of a voltage regulator during operation of the engine, the indicating lamp would remain off and the battery would be overcharged. This could result in disastrous damage such as spouting of electrolyte from the battery and destruction of electric loads connected to the battery.

SUMMARY OF THE INVENTION

Accordingly, it is an object of this invention to provide a new and improved device for indicating the charging state of a battery.

More specifically, it is an object of the invention to provide an indicating device capable of indicating not only an undercharged state of the battery but also an overcharged state.

A still further object of the invention is to provide such an aforementioned device with a simple construction and high reliability.

This invention accomplishes these objects by the provision of a device for indicating the charging state of a battery including an alternator having a field winding, rectifying means connected to the alternator for charging the battery, a series combination of a diode and an indicating lamp connected between an output terminal of the rectifying means and the battery, first switching means for forming a current path including the field winding, the diode, the indicating lamp and the battery when the battery voltage is less than a first predetermined value, second switching means for turning the first switching means off when the battery voltage reaches the first predetermined value, third switching means connected to the junction of the diode and the indicating lamp to form a current path including the indicating lamp and the battery and excluding the field winding when the battery voltage reaches a second predetermined value higher than the first predetermined value.

BRIEF DESCRIPTION OF THE DRAWINGS

This invention will be more easily understood from the following detailed description taken in conjunction with the accompanying drawings in which.

DESCRIPTION OF THE PREFERRED EMBODIMENTS

Figure 1:
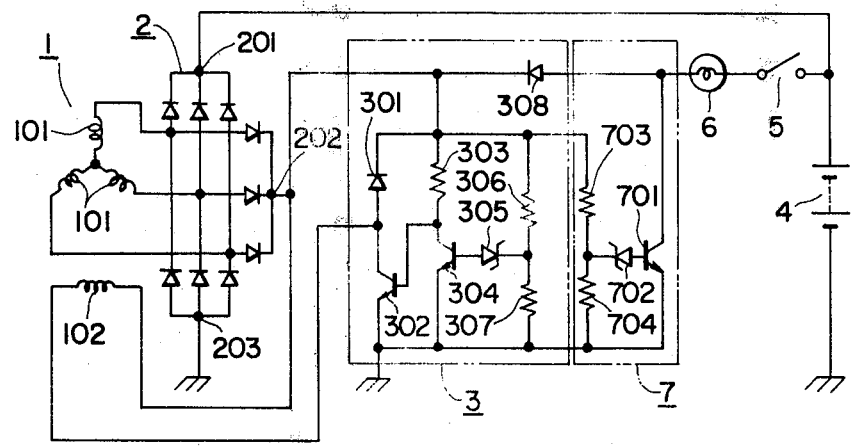
FIG. 1 is one embodiment of an electric circuit according to the present invention.

Refering to the drawings, first to FIG. 1, a three-phase alternator 1, which is driven by an internal combustion engine, not shown, including a star-connected armature winding 101 and a field winding 102. A full wave rectifier 2, which rectifies the output voltage of the alternator 1, includes a first output terminal 201, a second terminal 202 and a third terminal 203. A series combination of a battery 4, a key switch 5, an indicating lamp 6 and a diode 308 is connected to the field winding 102 to form a field current supplying circuit.

A voltage regulator, generally designated by the reference numeral 3, is employed to maintain the output voltage of the alternator 1 at a predetermined value in a manner to be described. A diode 301 is connected across the field winding 102 to absorb surge voltages generated by the winding 102. A first transistor 302 connected in series with the field winding 102 functions as a switching means for interrupting the field current of the field winding 102.

A resistor 303 is connected between the base of the transistor 302 and the second terminal 202. A second transistor 304 is connected across the base and the emitter of the first transistor to by-pass the base current of the first transistor 302. First series-connected resistors 306 and 307 are connected between the second terminal 202 and ground to form a first voltage dividing circuit. A first Zener diode 305 is connected between the junction of the first series-connected resistors 306 and 307 and the base of second transistor 304. The Zener diode 305 is activated when the output voltage of the alternator 1 reaches the first predetermined value.

An overcharging detector, indicated generally at 7, detects the output voltage of the alternator 1 at the second predetermined value in a manner to be described. A third transistor 701 is connected between the battery 4 and ground through the key switch 5 and the indicating lamp 6. A second Zener diode 702 is connected between the junction of the second series-connected resistors 703 and 704, which form a second voltage dividing circuit, and the base of the third transistor 701. The Zener diode 702 is activated when the output voltage of the alternator 1 reaches the second predetermined value which is higher than the first predetermined value.

The operation of the above-described circuit is as follows. Upon the starting of the engine, the key switch 5 is closed and base current to the transistor 302 flows from the battery 4 through the key switch 5, the charge indicating lamp 6, the diode 308 and the resistor 303 thereby causing the transistor 302 to turn on. When the transistor 302 turns on, field current flows from the battery 4 (rated at 12 V for example) to the field winding 102 through the key switch 5, the indicating lamp 6, the diode 308 and the transistor 302, thereby producing a magnetomotive force in the field winding 102. At the same time, the field current flows through the indicating lamp 6 to light the same, showing that the battery 4 is not being charged.

When the engine is started in this state, the alternator 1, which is driven by the engine, generates an alternating output voltage in the armature winding 101 in response to rotation thereof with the output voltage rectified by the full-wave rectifier 2. At this time, when the output voltage at the terminal 202 is lower than the first predetermined value, the potential level at the junction of the first voltage dividing circuit including resistors 306 and 307 is sufficiently low that the Zener diode 305 is maintained in a non-conducting state so that field current continues to be supplied thereby causing the output voltage of the alternator 1 to increase according to the speed of rotation of the alternator 1.

Following start-up, if the rotation speed of the alternator 1 further increases and the output voltage of the alternator 1 becomes higher than the first predetermined value (for example 14 volts), the potential level at the junction of the first voltage dividing circuit correspondingly increases causing the Zener diode 305 to conduct. When the Zener diode 305 turns on, base current to the transistor 304 flows through the Zener diode 305 thereby causing the transistor 304 to conduct. Conduction of the transistor 304 removes the base current from the transistor 302 thereby making the transistor 302 turn off causing an interruption in the field current through the field winding 102 and resulting in a reduction in the output voltage of the alternator 1.

When the output voltage of the alternator 1 becomes lower than the first predetermined value, the Zener diode 305 and the transistor 304 will be rendered non-conductive again. Therefore, the transistor 304 turns off thereby turning on the transistor 302 so that field current is again supplied and the output voltage of the alternator 1 increases. Continuing in this manner of operation, the output voltage of the alternator 1 is maintained at the first predetermined value in order to charge the battery 4 to the predetermined value.

When the voltage at the first output terminal 202 is nearly equal to the voltage of the battery 4 during the operation described, the voltage across the incidating lamp 6 becomes low and the indicating lamp 6 is extinguished, thereby indicating that the battery 4 is charged. Subsequently, when the output voltage of the alternator 1 exceeds the first predetermined value for any reason (such as a general failure of the voltage regulator 3) and reaches the second predetermined value, for example 16 volts which would overcharge the battery 4, the potential level at the junction of the second voltage dividing circuit including the resistors 703 and 704 becomes sufficiently high to cause the Zener diode 702 to conduct. When the Zener diode 702 conducts, base current to the transistor 701 flows through the Zener diode 702 thereby causing the transistor 701 to turn on. Upon the transistor 701 turning on, current flows from the battery 4 to the indicating lamp 6 through the key switch 5 and the transistor 701 thereby causing the indicating lamp 6 to light showing that the battery is being overcharged. Accordingly, the indicating lamp 6 warns the driver of a dangerous condition, preventing potential electrical device failure due to overcharging and excessively high voltage of the battery. For this condition, as the output voltage at the second output terminal is blocked by the diode 308, current does not flow through the transistor 701.

Figure 2:
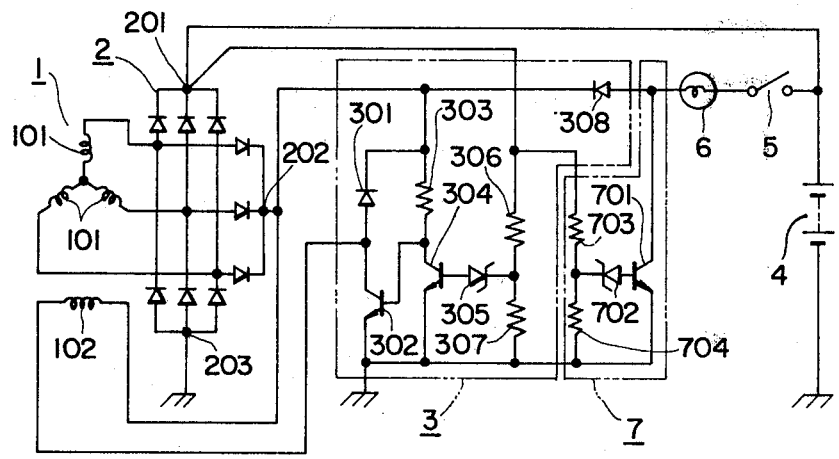
FIG. 2 is another embodiment of an electric circuit according to the present invention.

FIG. 2 wherein like reference numerals designate components identical to those shown in FIG. 1, illustrates a modification in accordance with the present invention. In FIG. 2, the junction between the resistors 306 and 703 is connected to the first output terminal 201 of the rectifier 2 or the positive terminal of the battery 4. The operation of the circuit shown in FIG. 2, however, is similar to that of FIG. 1.

As described above, the first switching means (transistor 302) controls the field current in order to maintain the output voltage of the alternator 1 at the first predetermined value and also the on-off operation of the incidating lamp 6 in accordance with the output voltage of the alternator 1. The second switching means (transistor 304), connected between ground and the junction of the diode 308 and the indicating lamp 6 conducts so as to illuminate the indicating lamp 6 when the output voltage at the rectifier 2 reaches the second predetermined value higher than the first predetermined value. Thus, when the voltage of the battery 4 is lower than the first predetermined value, the indicating lamp is illuminated and when the voltage of the battery 4 reaches the first predetermined value, the indicating lamp 6 is extinguished. Moreover, when the output voltage of the alternator 1 becomes still higher for some reason and exceeds the second predetermined value, the indicating lamp 6 is illuminated again thereby providing a warning to the driver and preventing subsequent failure of electrical devices of the vehicle due to excessive charging and overvoltage of the battery 4. Moreover, since only a single indicating lamp is required with the present invention and since the first switching means for controlling the charging voltage also functions as the control circuit for the indicating lamp, a reliable and simple device for indicating the charging state of a battery is provided.

While the present invention has been illustrated and described in conjunction with preferred embodiments thereof, it is to be understood that numerous charges and modifications may be resorted to without departing from the spirit and scope of the present invention.

What is claimed is:

1. A device for indicating the charging state of a battery charged by an alternator having a field winding connected to the battery by rectifying means comprising:

a series combination of a diode and an indicating lamp adapted to be connected between an output terminal of the rectifying means and the battery;

first switching means for forming a current path including the field winding, the diode, the indicating lamp and the battery when the battery voltage is less than a first predetermined value;

second switching means for turning the first switching means off when the battery voltage reaches the first predetermined value; and third switching means connected to the battery exclusively at the junction of the diode and the indicating lamp under normal operating conditions, said third switching means provided for detecting the battery voltage and for forming a current path including the indicating lamp and the battery and excluding the field winding when the battery voltage reaches a second predetermined value higher than the first predetermined value, whereby said indicating lamp provides an indication of the battery voltage reaching said second predetermined value.

2. The device for indicating the charging state of a battery of claim 1 wherein the diode has an anode connected to the incidating lamp and a cathode connected to the output terminal of the rectifying means.

3. The device for indicating the charging state of a battery of claim 2 wherein the first switching means comprises a first transistor having a base connected to the output terminal of the rectifying means a collector connected to the field winding and an emitter connected to ground.

4. The device for indicating the charging state of a battery of claim 3 wherein the second switching means comprises a second transistor having a collector-emitter circuit connected across the base-emitter circuit of the first transistor and a first reference diode having an anode connected to the base of the second transistor and a cathode connected to the output terminal of the rectifying means, the first reference diode becoming conductive when the voltage of the rectifying means reaches the first predetermined value thereby rendering the second transistor conductive.

5. The device for indicating the charging state of a battery of either of claims 3 or 4 wherein the third switching means comprises a third transistor having a collector-emitter circuit connected between the junction of the diode and indicating lamp and ground, and a second reference diode having an anode connected to the base of the third transistor and a cathode connected to the output terminal of the rectifying means, the second reference diode becoming conductive when the voltage of the rectifying means reaches the second predetermined value thereby rendering the third transistor conductive.

6. A device for indicating the charging state of a battery comprising:
   a single indicating means in series with a diode and said battery;
   means for activating said single indicating means in response to the battery voltage being below a first predetermined value; and
   means for sensing the battery voltage and for activating the single indicating means in response to the voltage of the battery being above a second predetermined value greater than said first predetermined value to indicate that the battery voltage is above the second predetermined value, said means for sensing and activating being connected to said battery exclusively at the junction of said diode and said single indicating means under normal operating conditions.

7. The device for indicating the charging state of a battery of claim 6 wherein the indicating means comprises an indicating lamp and further comprising a diode in series combination with the indicating lamp, the combination being adapted to be connected in a current path between the battery and an output terminal of an alternator provided for charging the battery.

8. The device for indicating the charging state of a battery of claim 7 wherein the means for activating the single indicating means in response to the voltage of the battery being below a first predetermined value comprises first switching means for forming a current path including a field winding of the alternator, the diode and the battery and first means for sensing the output voltage of the battery, the first switching means being coupled to and operating in response to the first sensing means.

9. The device for indicating the charging state of a battery of claim 8 further comprising second switching means for turning the first switching means off when the battery voltage is greater than the first predetermined value.

10. The device for indicating the charging state of a battery of claim 9 wherein the means for activating the single indicating means in response to the voltage of the battery being above a second predetermined value comprises third switching means for forming a current path including the indicating lamp and the battery and excluding the field winding and second means for sensing the output voltage of the battery, the third switching means being coupled to and operating in response to the second sensing means.

11. A device for indicating the charging state of a battery charged by an alternator having a field winding connected to the battery by rectifying means comprising:
   a series combination of a first diode and an indicating lamp adapted to be connected between an output terminal of the rectifying means and the battery;
   first switching means for forming a current path including the field winding, the first diode, the indicating lamp and the battery when the battery-voltage is less than a first predetermined value;
   second switching means for turning the first switching means off when the battery voltage reaches the first predetermined value; and
   third switching means connected to the junction of the first diode and the indicating lamp for forming a current path including the indicating lamp and the battery and excluding the field winding when the battery voltage reaches a second predetermined value higher than the first predetermined value, wherein the third switching means comprises a transistor having a collector-emitter circuit connected between the junction of the first diode and indicating lamp and ground, and a second reference diode having an anode connected to the base of the transistor and a cathode connected to the output terminal of the rectifying means, the second reference diode becoming conductive when the voltage of the rectifying means reaches the second predetermined value thereby rendering the transistor conductive.

12. A device for indicating the charging state of a battery comprising:
   an alternator for charging said battery and having a field winding, a first rectifying output terminal and a second rectifying output terminal, said first rectifying output terminal being coupled to said battery;
   a series combination of a diode and an indicating lamp, said diode being coupled between said second rectifying output terminal and said battery in such a manner that the cathode of said diode is connected to said second rectifying output terminal and that the anode of said diode is connected to said indicating lamp;
   a first transistor having a base connected to said second rectifying output terminal, a collector connected to said field winding and an emitter connected to ground, said first transistor being rendered conductive to form a current path, including said field winding, to said indicating lamp when the battery voltage is less than a first predetermined value;
   a second transistor having a collector connected to the base of said first transistor and an emitter connected to ground, said second transistor operating to render said first transistor non-conductive when biased;

a first constant voltage diode having an anode connected to the base of said second transistor and a cathode connected to said second rectifying output terminal, said first constant voltage diode being rendered conductive to bias said second transistor when the battery voltage reaches the first predetermined value;

a third transistor having a collector connected to the anode of said first diode and an emitter connected to ground; and a second constant voltage diode having an anode connected to the base of said third transistor and a cathode connected to said second rectifying output terminal, said second constant voltage diode operating to bias said third transistor to form a current path, excluding said field winding, to said indicating lamp when the battery voltage reaches a second predetermined value which is higher than said first predetermined value.

13. The device of claim 12 further comprising a voltage divider connected between said second rectifying output terminal and said cathode of said first constant voltage diode.

14. The device of claim 13 further comprising a voltage divider connected between said second rectifying output terminal and said cathode of said second constant voltage diode.

* * * * *